United States Patent [19]
Kim

[11] 3,915,260
[45] Oct. 28, 1975

[54] BRAKE DEVICE FOR AUTOMOBILES

[76] Inventor: Seung Mook Kim, 22-51, Kong Hang-dong, Yongdongpo-ku, Seoul, Korea

[22] Filed: July 11, 1974

[21] Appl. No.: 487,444

[30] Foreign Application Priority Data
July 31, 1973  North Korea.................. 4413/73

[52] U.S. Cl............... 188/2 R; 74/812; 188/355; 192/12 B; 192/12 C
[51] Int. Cl.²........................................... B60T 1/00
[58] Field of Search........... 188/2 R, 71.2, 291, 347, 188/348, 355; 74/812; 192/12 B, 12 C

[56] References Cited
UNITED STATES PATENTS

| | | |
|---|---|---|
| 1,089,483 | 3/1914 | Laffond ............................. 74/812 |
| 1,653,785 | 12/1927 | Sauveur et al. ..................... 188/355 |
| 1,677,481 | 7/1928 | Lareva ................................ 188/291 |
| 2,467,627 | 4/1949 | Olson ................................. 74/812 X |

*Primary Examiner*—George E. A. Halvosa
*Attorney, Agent, or Firm*—Millen, Raptes & White

[57] ABSTRACT

A device of brake power supply, wherein a rotation disk is set on a shaft transmitting rotation from an engine so as to make possible rotation toward a fixed direction regardless of the rotation direction of the shaft, a clutch disk being placed in contact with the rotation disk by the operation of a brake pedal, lever or similar means, causing the clutch disk to rotate together with the rotation disk, and adding a strong driving power to a master brake cylinder by a connection between the piston of the brake cylinder and a band wound around the clutch disk. The torque of the clutch disk may also be applied directly to the brake shoes.

3 Claims, 9 Drawing Figures

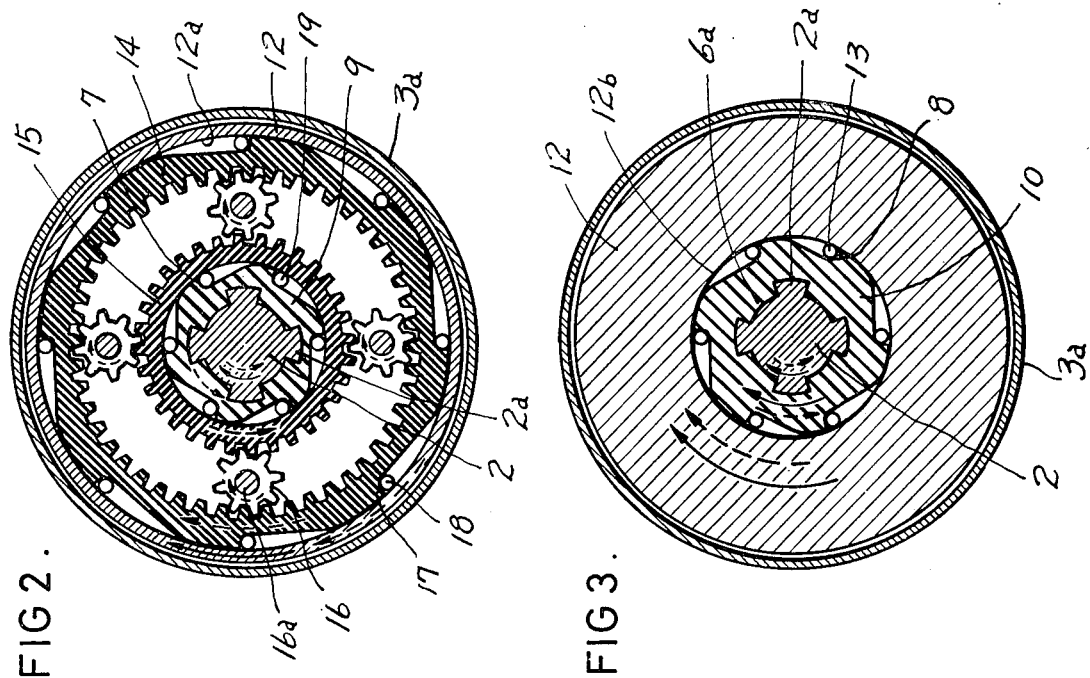
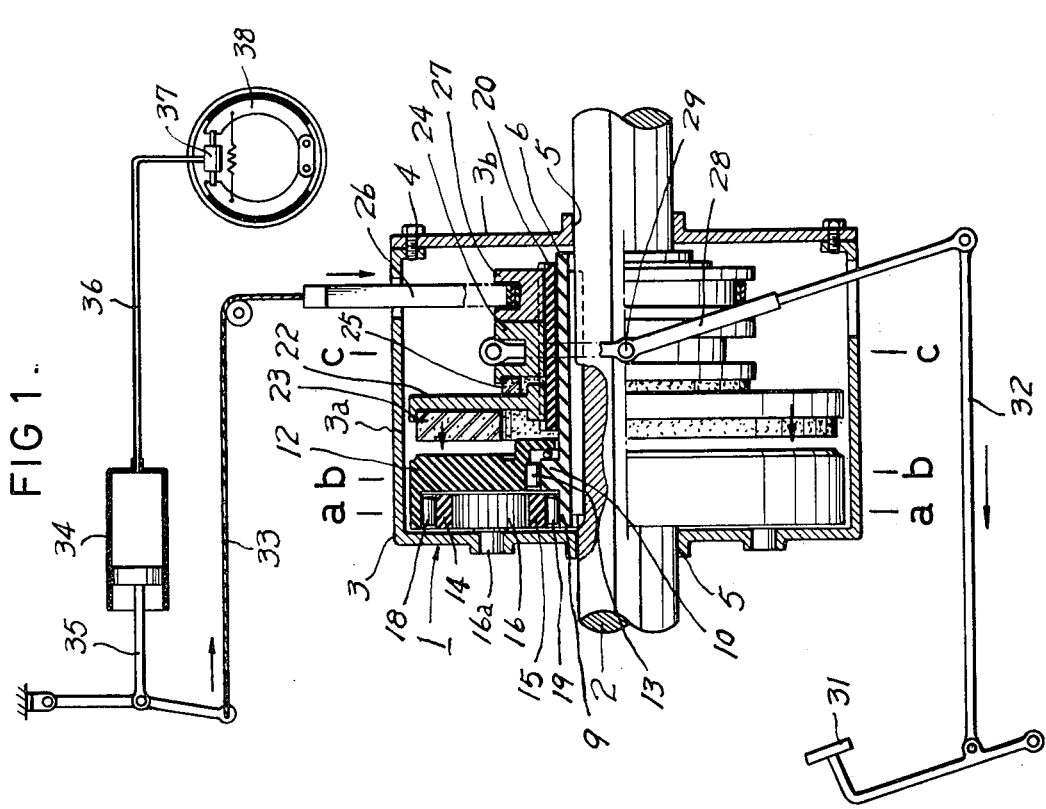

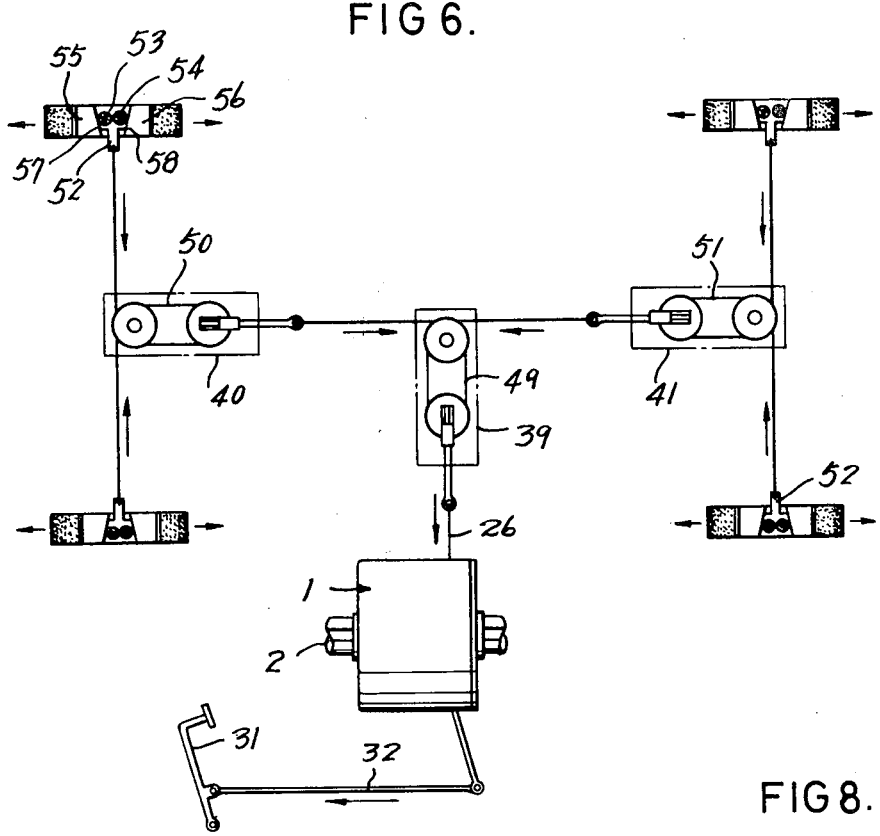
FIG 6.
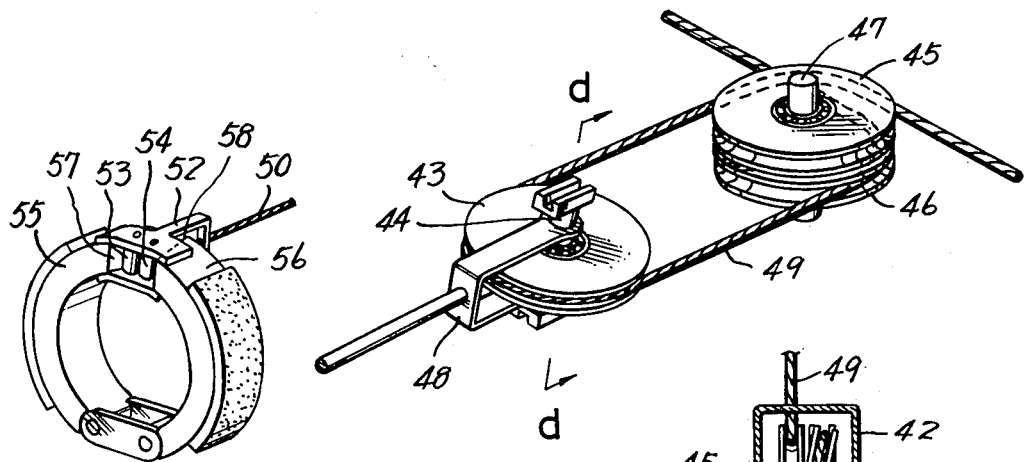
FIG 8.
FIG 7.
FIG 9.

BRAKE DEVICE FOR AUTOMOBILES

BACKGROUND OF THE INVENTION

This invention relates to a brake device for automobiles, especially to friction type, servo-brake devices for brake power supply, characterized by increasing considerably the brake capacity of the brake device of the automobile by appling the torque of a shaft transmitting the rotation of the engine to the piston of the master brake cylinder, or directly to the brake shoes.

In general, the existing known servo-brake devices are vacuum type servo-brake using the "hydro-vac" requiring vacuum produced by the engine or air type servo-brake using the "hydro-air-pack" requiring compressed air.

The vacuum type servo-brake uses a system containing a power cylinder, power piston, relay valve, relay valve piston, check valve, etc., and hydro-vac requires an oil pressure system containing a hydraulic cylinder and hydraulic piston, etc., both types being very complicated. Not only are these types of brake devices expensive to manufacture, but they are also subject to mechanical difficulty in addition, as the loading power required for the operation of the hydro-vac must be obtained from vacuum pump run by the engine aspirator system or engine itself, interruption of engine operation is liable to result in prompt interruption of the function of hydro-vac or in weakening of the function in consequence of which, it fails to produce sufficient vacuum capacity for the brake device.

On the other hand, the air type servo-brake is also inconvenient because of the use of complicated components in the hydro-air-pack and the necessity for the separate installation of an air tank and air compressor. Not only must some of the engine output power be consumed for air compression, which brings about the loss of power, but the hydro-air-pack depends on the function of the engine. Additionally, the usual servo-brake makes a noise when operating the pump, and in case of air brake, an undesirable explosive sound is set off at the time of the exhaust of the air after the operation of the brake.

SUMMARY OF THE INVENTION

This invention is aimed at providing a friction type servo-brake which eliminates the defects and weak points of the existing servo-brake as above-described.

Another aim of this present invention is to provide a servo-brake having little possibility of trouble and having simple construction by using brake service operated by rotation torque of the transmission shaft of the automobile without need of complicated structure such as the aforesaid hydro-pack or hydro-air-pack.

Still another aim of the present invention is the ability to effect sufficient brake capacity without loss of effect by the stopping of the operation of engine, and to produce a brake device which can cause brake operation without the use of engine output power or other power.

One of the features of this invention achieving the above-mentioned aims is apparatus for providing brake power supply by the torque of the rotation of a shaft transmitting the rotation of the engine, such as the output power shaft or input power shaft, whereby the strong driving power of the shaft is applied to the piston rod of the master cylinder.

The aforesaid apparatus for brake power supply is comprised of a cylindrical shaft having a spline on its inner surface for rotating together with the transmission shaft inside a casing, and a rotation disk which is rotated in a single direction regardless of the rotation direction of the cylindrical shaft and the transmission shaft. The driving means situated at one end of the cylindrical shaft includes a clutch sleeve having splines formed on its outer surface, mounted for independent rotation on the cylindrical shaft, a clutch disk having friction plate facing the aforesaid rotation disk, is slidably mounted on said sleeve for lengthwise rotation along said splines, a pushing ring installed on the clutch sleeve so as to move the clutch disk along the clutch sleeve against the rotation disk, and in addition, a winding wheel having a driving band wound around the outside part, is splined to the clutch sleeve for rotation therewith.

The aforesaid pushing ring is actuated by a driving rod operated by the brake pedal, lever or the similar means, and one end of the driving band, in case of oil pressure brake, is connected to the piston rod of the master cylinder of an oil brake through proper transmitting device, and for a mechanical brake, is connected to the brake shoes of each vehicle, whereby upon actuation of the pushing ring, the driving band is wound up, applying the torque of the transmission shaft to the brakes.

BRIEF DESCRIPTION OF THE DRAWINGS

These and other objects and features of the invention will be more clear from a reading of the ensuing part of the specification with reference to the accompanying drawings in which:

FIG. 1 shows a cross-sectional view of an embodiment of this invention, for the application of the brake power supply to an oil pressure brake.

FIG. 2 is a cross-sectional view taken along $a—a$ line of FIG. 1.

FIG. 3 is a cross-sectional view taken along $b—b$ line of FIG. 1.

FIG. 6 shows another embodiment of this invention, outlined in the ground plane for the application of the brake power supply to a mechanical brake.

FIG. 7 is a perspective drawing of the brake shoe shown in FIG. 6.

FIG. 8 is a perspective drawing of the pulley device shown in FIG. 6.

FIG. 9 is a cross-sectional view taken along $d—d$ line of FIG. 8.

FIGS. 1 to 5 show the embodiment of this invention as applicable to an oil pressure brake system. The device for brake power supply of the invention numbered generally as 1 on FIG. 1 is shown installed on a transmission shaft 2. A casing 3 attached to the proper place of the shaft 2 is composed of a side wall 3b fixed to the casing frame 3a by bolt 4. The center of casing frame 3a and side wall 3b has a bored core hole 5 where shaft 2 can penetrate through. A hollow cylindrical shaft 6 having spline 6a on the inner surface thereof is mounted on the transmission shaft 2 within the casing 3, the transmission shaft 2 having a spline 2a interlocking with the spline 6a for the rotation of shaft 6 with 2 in a fixed relationship.

Figure 5:
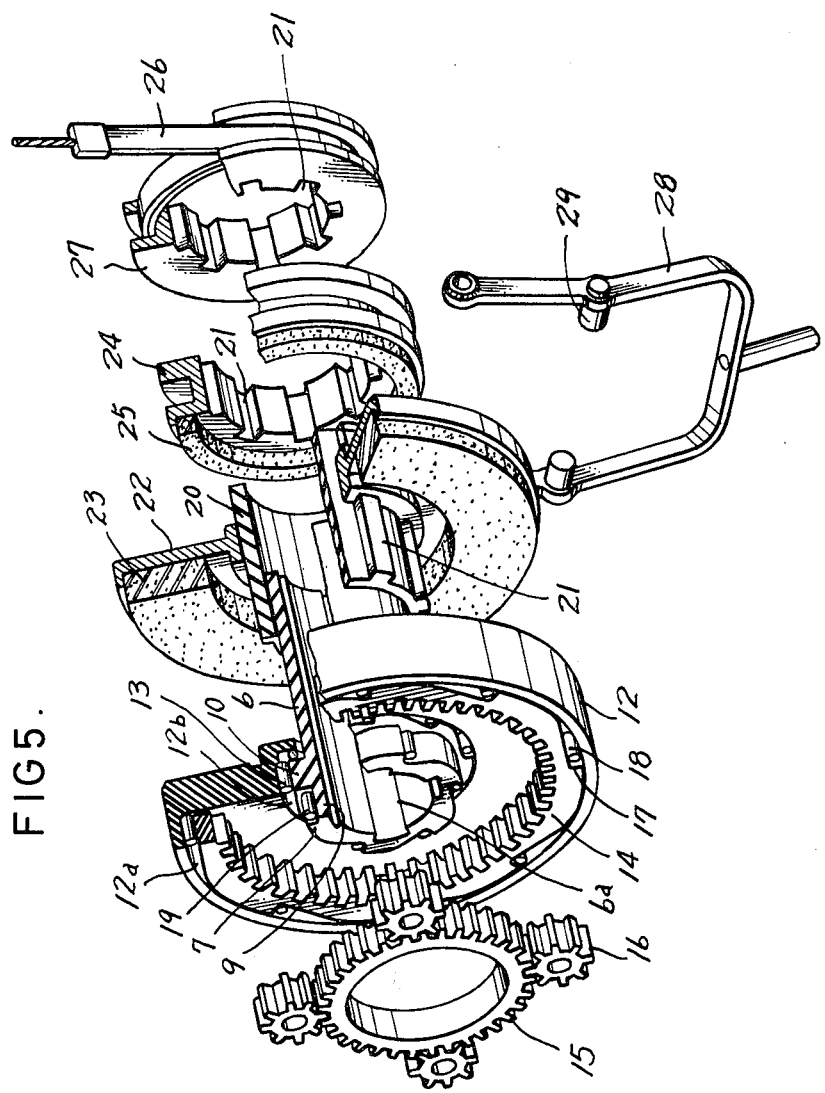
FIG. 5 is an exploded perspective view, partially broken away showing the parts of the brake power supply apparatus in this invention.

On the outer surface of one end of the cylindrical shaft 6, two series of races 9,10, having cam surfaces 7,8, which have opposite directions to each other, are formed. A rotation disk 12 having a circular center bore encompasses the portion of the shaft 6 having the races 10. A roller 13 is inserted in each of the races for interaction with the surface 12b of the inner bore of the rotation disk 12.

A collar having a circular inner surface 12a is formed on the outer edge of the rotation disk 12, the surface 12a of the collar overhanging the races 9 and cam surfaces 7 of the cylindrical shaft 6.

A sun gear 15, having a circular inner bore, is also mounted on the shaft 6 encompassing the portion of the shaft 6 having the races 9. Rollers 19 are inserted in the races 9 for driving the sun gear 15 when the shaft 2 rotates in the opposite direction from that driving the disk 12 through the rollers 13.

A ring gear 14, having a plurality of races with cam surfaces 17 on its outer surface is juxtaposed to the inner surface 12a of the collar on the rotation disk 12. The ring gear 14 and the sun gear 15 are interconnected by planetary gears 16 mounted on supplemental shafts set in the casing 3.

Rollers 18 are placed in between the cam surfaces 17 of the ring gear 14 for driving the disk 12 through its surface 12a. By this arrangement, the rotation disk 12 is driven in only one direction regardless of the direction of rotation of the transmission shaft 2.

A clutch sleeve 20 is mounted to rotate freely on another surface of cylindrical shaft 6 and on the outer surface of the clutch sleeve 20, a plurality of splines 21 is formed.

On the clutch sleeve 20, a clutch disk 22 is slidably mounted to move in lengthwise direction along clutch sleeve 20, being able to rotate together with the clutch sleeve 20 by splines 21. On the surface of the clutch disk 22 facing the rotation disk 12, a friction plate 23 is fastened. Furthermore, a pushing ring 24 is also slidably mounted on the clutch sleeve 20 by the splines 21, movable lengthwise adjacent to the clutch disk 22, the pushing ring 24 and the clutch disk 22 being interlinked by joint 25 made of elastic material. Adjacent the pushing ring 24, a winding wheel 27, whereon a driving band 26 has been wound is also mounted on the clutch sleeve 20 so as to rotate together with clutch sleeve 20 by splines 21.

Figure 4:
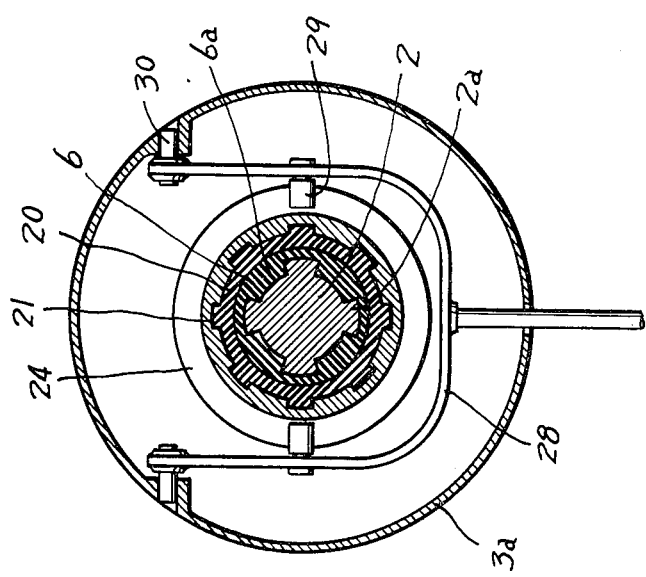
FIG. 4 is a cross-sectional view taken along $c—c$ line of FIG. 1.

The aforesaid pushing ring 24, as indicated in FIG. 4, drives a pair of roller pins 29 attached to the center of a Y-shaped drive rod 28. Both arms of the Y-shaped drive rod 28 are supported at the top by pivot pins 30 pivoted inside the casing frame 3a, the lower end of drive rod 28 being connected to a brake pedal 31 by a connecting rod 32. The outer end of the driving band 26 wound to winding wheel 27 operates a piston rod 35 of a master cylinder 34 by a connecting means such as wire, or link. As is well known, the master cylinder 34 is connected to the wheel cylinders 37 of each wheel by oil pipes 36, the pistons of the wheel cylinders 37 being expanded by the oil pressure being supplied from master cylinder 34, so as to expand the brake shoes 38.

The brake device of this invention as stated above, is operable when the automobile is in forward movement or backward movement, cylindrical shaft 6 rotating simultaneously with the rotation of transmission shaft through spline 2a and 6a. When the transmission shaft 2 is rotated to the forward direction (clockwise direction shown by an arrow line on FIG. 3), as by the way of action of ordinary free wheeling the rotation torque of transmission shaft 2 is transmitted to cam 8 of the inner race 10 of shaft 6, and rotates rotation disk 12 clockwise as indicated by the arrow line of FIG. 3 by conveying clockwise rotation torque to rotation disk 12 by rollers 13. At this time, as the cam 7 of the inner race 9 on the shaft 6 is in opposite direction to the cam 8 of the above-mentioned inner race 10, roller 19 fails to transmit rotation torque to sun gear 15. As a result, the gear train including ring gear 14, planetary gear 16 and sun gear 15, is inactive.

On the contrary, when the shaft 2 of the transmission drives the automobile oppositely toward the direction of retrogressive motion (reverse clockwise direction shown by arrow of dotted lines in FIGS. 2 and 3) the rotation torque which is transmitted to the inner race 10, cam 8, is not transmitted to rotation disk 12 through roller 13, and the inner race 10 runs free. However, the cam 7 of the inner race 9 puts roller 19 in operation so transmit counter clockwise rotation torque to sun gear 15, and in turn the rotation torque of sun gear 15 is changed in direction by each planetary gear 16, and transmits clockwise direction to ring gear 14, and the rotation power of clockwise rotation direction of the ring gear 14 is transmitted to rotation disk 12 through roller 18. Consequently, the rotation disk 12 rotates in opposite direction to the rotation direction of the transmission shaft 2. In other words, the disk 12, regardless of the rotation direction of the shaft 2, rotates toward the same direction by the aforesaid operation.

At this time, in order to brake the runner vehicle, the brake pedal 31 is stepped on under proper pressure as known, actuating connecting rod 32 and the Y-shaped drive rod 28 is pivoted on pins 30. The pushing ring 24 is thus moved toward the rotation disk 12 and pushing ring 24 adds pressure to clutch disk 22 while moving along clutch sleeve 20. The clutch disk 22 with attached friction plate 23 thereto, moves to disk 12 and rotates together with disk 12 in the same direction. Thus when clutch disk 22 rotates along disk 12, the clutch sleeve 20 rotates by splines 21, and at the same time, while the winding wheel 27 is rotating, it winds driving band 26. Accordingly, the driving band 26 receives tension through the rotation power of the winding wheel 27, and by the said tension, the piston rod 35 of master cylinder 34 can be operated through connecting means 33 such as wire, and the oil pressure inside master cylinder 34 is applied to wheel cylinder 37 by the well known method, so that the brake power is caused to brake shoe 38.

Whereas the application of device of brake power supply of the invention to hydraulic brakes has been explained, the embodiment applying this invention to mechanical brake is explained as follows, according to FIGS. 6 to 9.

The device of brake power supply is shown on FIG. 6 established on transmission shaft 2 with the driving band 26 connected by a cable or wire rope to a central equalizer 39, in the form of a pair of pulleys 43,45.

Taking the equalizer 39 for centre, left equalizer 40 and right equalizer 41 are established on both sides of the equalizer 39. All three equalizers 39, 40 and 41 are of the same construction.

FIGS. 8 and 9 show the detailed construction of the equalizers 39, 40 and 41, each of which is comprised of housing 42, containing a movable shaft 44 having mounted thereon balance pulley 43 and a fixed shaft 47 having mounted thereon balance pulleys 45 and 46, the shafts 44 and 47 being aligned. A Y-shaped holder 48 interconnects both ends of shaft 44 to the winding band 26 through a cable or wire rope.

One end of a cable 49 wound on balance pulley 43, of the central equalizer 39 is wound over one balance pulley 45 and connected to the movable shaft holder 48 of the left side equalizer 40. The other end of cable 49 is wound over the other balance pulley 46 and connected to movable holder 48 of the right side equalizer 41.

Likewise, cables 40,41 wound on the balance pulleys of the equalizers 40,41 are connected to the push roller holders 52 of the front and rear wheels. One pair of push rollers 53 and 54 is pivoted to each of the push roller holders 52, which are situated between the inclined planes of the top 57 and 58 of brake shoes 55 and 56. If tension from the brake power supply device 1 is applied to cable 26 by operation of brake pedal or brake hand lever, the tension is equally distributed to the equalizers 40 and 41, respectively, and, as it pulls front and rear push roller holders 52 by equal power, and each pair of the push rollers 53 and 54, pivoted to the holders 52 give tension to the top inclined planes of brake shoes 55 and 56, so that the brake shoe is expanded and gives brake power to the wheel drum.

As it is clear from the above-mentioned explanation, the brake device following this invention supplements the brake operation with the aid of the rotation power of the shaft of transmission so that this device does not need such complicated and elaborate set-up devices as used in vacuum type servo-brake or air type servo-brake. In addition, it is less expensive to make and it is easily disassembled. Thus, there is less possibility for trouble.

In addition, in the brake device of this invention, the brake capacity is not affected by whether the engine is in operation or not, and it can bring about the strong brake power without any spending of the engine power or the other power. Therefore, it can be used for a small vehicle or a heavy vehicle. Furthermore, the brake device of this invention can be not only used for oil pressure foot brakes, but also for the mechanical handbrake. In case it is used with the mechanical handbrake, it can give just as strong and safe brake power as with an oil foot brake.

What is claimed is:

1. In a vehicular braking system utilizing longitudinal movement means for applying the brakes, and wherein the vehicle power train includes a drive shaft, an apparatus for applying the torque of the drive shaft to the longitudinal movement means comprising: a disc concentrically mounted on the drive shaft for rotation thereon; transmission means interconnecting said disc and said drive shaft for unidirectionally rotating said disc by either clockwise or counterclockwise rotation of said drive shaft; a brake drive wheel rotatably mounted on said drive shaft; elongated flexible band means having one end attached to the periphery of said brake drive wheel and a portion thereof wrapped around the periphery of said wheel, the other end of said band means being connected to the longitudinal movement means; and clutch means for applying the torque of the rotation of said disc to said brake drive wheel.

2. The apparatus of claim 1 further including a first tube splined on said drive shaft for rotation therewith and wherein said disc is rotatably mounted on said first tube and includes a clutch face on one side thereof, a second tube rotatably mounted on said first tube, said second tube having longitudinal splines on its outer periphery, and wherein said clutch means includes a clutch plate mounted on said second tube for longitudinal movement along said splines and rotation therewith, a clutch plate driving ring mounted adjacent said clutch plate on said second tube for longitudinal movement along said splines and rotation therewith and means for advancing said clutch plate to the clutch face of said disc through said clutch plate driving ring, and wherein said brake drive wheel is splined to said second tube.

3. The apparatus of claim 2 wherein said transmission means includes first and second oppositely disposed cam races in the outer surface of said first tube, said disc being mounted on said first cam race for rotation in one direction therewith, said transmission means also including a sun gear mounted on said second cam race for rotation therewith in the opposite direction, a ring gear concentric with said sun gear, a plurality of planetary gears interconnecting said sun gear and said ring gear, a collar integral with said disc and extending over the outer surface of said ring gear, and a third cam race in the outer surface of said ring gear for unidirectionally driving said disc through said collar, whereby said disc is unidirectionally driven regardless of the direction of rotation of said drive shaft.

* * * * *